Feb. 2, 1937.  H. GOLDSTEIN  2,069,438
DISPENSER FOR COFFEE CANS
Filed May 15, 1935

INVENTOR
Harry Goldstein.
BY
Chas. M. C. Chapman.
ATTORNEY

Patented Feb. 2, 1937

2,069,438

UNITED STATES PATENT OFFICE 2,069,438

DISPENSER FOR COFFEE CANS

Harry Goldstein, Brooklyn, N. Y., assignor of one-half to Charles Seinfeld, Brooklyn, N. Y.

Application May 15, 1935, Serial No. 21,537

5 Claims. (Cl. 221—104)

This invention has reference to coffee dispensers, and particularly relates to a dispenser for coffee containers or cans in their original form, or before being broken or the contents used.

Heretofore coffee containers have been made or constructed with false bottoms, and those which are not so provided have the bottom open so as to permit the ingress of air, or their entire top open, very much to the detriment of the contents.

Among the objects of my invention is to provide a reciprocating device located at one side of the bottom of the container, and capable of delivering or dispensing a predetermined amount of the contents of the can; to provide a means by which pulverized coffee may be hermetically sealed and delivered from the side near the bottom of the can, as distinguished from a means which occupies a goodly portion of the can bottom, and from which, or through the medium of which, the contents of the can may be delivered to the last grain; to provide a mechanism, such as outlined in the foregoing, which is arranged so as to deliver a predetermined amount of coffee, or the contents of the can, by a movement parallel with the side of the can whereby it can empty the latter; and to provide holders which may carry finely comminuted material, such as coffee, substitutes therefor, powdered or granulated substances such as sugar, salt and other material, which are subject to deterioration from the admission of air, or which is highly hygroscopic in character, any may be dispensed therefrom without deterioration.

In order that my invention may be clearly understood, I have provided a drawing wherein.

Figure 3:
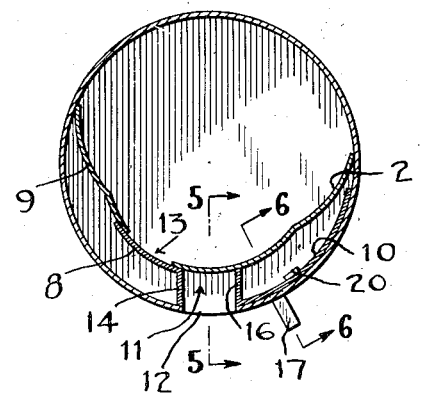
Figure 3 is a horizontal section showing the valve in the position for delivering the contents of the can, in small quantities, this view being through the valve horizontally and also through the diaphragm horizontally, and the valve being shifted to open position.
Figure 4:
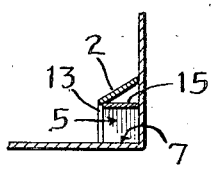
Figure 4 is a section vertically through the diaphragm and valve, showing the position of the parts indicated on the line 4—4 of Figure 2.
Figures 5, 6:
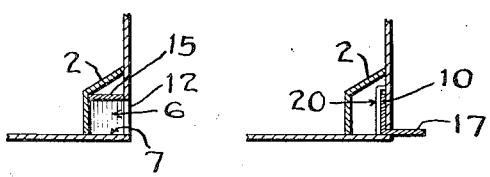
Figure 5 is a similar view indicating the position of the parts on the line 5—5 of Figure 3.
Figure 6 is a similar view showing the position of the parts on the line 6—6 of Figure 3.
Figure 7:
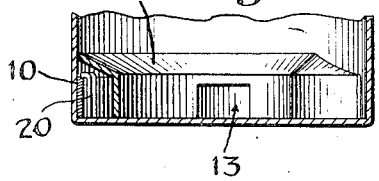
Figure 7 is a sectional view looking inwardly from the position of line 7—7 of Figure 2.

Referring to the drawing, the numeral 1 indicates a can or holder or receptacle which is hermetically sealed and which is adapted to contain coffee or other finely comminuted material. Within the can or holder is disposed a diaphragm or partition 2, the ends of which are arranged tangentially to the inner surface of the can or shell, as at 3 and 4, and at its top or roof is sealed against the said inner surface of the can. Between the shell of the can and the partition is arranged a valve which is open at opposite sides as indicated at 5 and 6, and at the bottom, as indicated at 7, see Figures 4 and 5, forming a small compartment 11, Figure 3. The valve has extended therefrom an elastic or resilient member 8, Figure 3, which travels snugly against one side of the partition, as indicated at 9, and from its opposite end extends a member 10, elastic or inelastic, which operates to shift the compartment 11, and which slides against the can or holder under the partition and across the opening 12 in the wall of the can. The valve, as previously stated, is provided at its front or inner side with an opening 5, Figure 4, cooperating with an opening 13 in the diaphragm. When the valve member is shifted, it operates from the opening 13 in the diaphragm to the opening 12 in the wall of the can, its compartment 11 cooperating with the two openings alternately. The compartment 11 has the two sides and top, as indicated at 14, 15 and 16, Figures 3, 4 and 5. Thus the valve operates as a measuring device or dispenser and measures a predetermined amount of coffee, taken from the bulk within the can through the opening 13, and delivers it to the outside of the shell of the can through the opening 12. Directly over the space, above the valve, the diaphragm is disposed, this preventing any of the contents getting behind the partition and thus stopping the easy manipulation of the valve.

In order to manipulate the valve, or slide it concentrically with the wall of the can, I have provided a small teat 17, made integral with the slide member of the valve and consisting of a flexible device which is bent upwardly against the inelastic extension 10, and which may be flexed downwardly and outwardly so as to enable the valve to be shifted. When the member is bent downwardly and outwardly, its travel is permitted by an elongated slot 18 above the bottom of the can in continuity with the opening 12 in the outer member or wall of the can near its bottom. A paper seal 19, or other tenacious sealing member, is provided on the outside of the can overlapping the inelastic manipulating member 10, to which the manipulating device 17 is attached, having the triple function of sealing the can, preventing the manipulating device from being accidentally operated, and preventing either moisture or air entering the can and affecting the contents thereof in any way.

Figure 1:
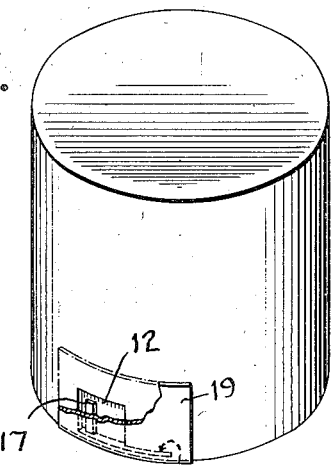
Figure 1 is a perspective view of the coffee can containing a pound or more showing it sealed against the admission of air, and the seal broken away so as to show the manipulating device.
Figure 2:
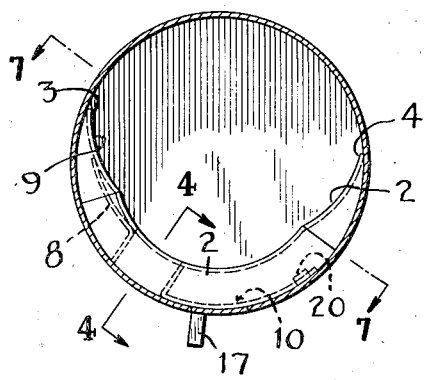
Figure 2 is a horizontal section taken above the diaphragm, and showing the manipulating device projecting outwardly and the valve in position to receive the coffee.

In operation, the elastic member 8 of the valve rides against the partition 9 with a tendency to press the valve outwardly against the shell of the can, and also causes the inelastic member to ride firmly in contact with the inner surface of the outer shell of the can and to close the opening thereof, the retaining member 20 being located so as to hold the same. Primarily, the seal is broken so as to enable the manipulating device 17 to be pressed downwardly and outwardly so that the valve can be shifted concentrically or approximately so, or it may be said to be parallel with the outer shell of the can from the open position of reception, shown in Figures 2 and 4, to the open position of delivery, shown in Figures 3 and 5, the manipulating device passing into the slot at the end of the opening in the shell. When the seal is in position, the device 17 is prevented from being gotten at so that it cannot be manipulated; and the valve with its resilient member is held in position by frictional contact with the diaphragm and shell of the can.

Having thus described my invention, what I claim and desire to secure by Letters Patent is:

1. A can having a delivery opening therein, a diaphragm provided with an opening therein and spaced apart from the can, a valve sliding between the two, means for manpulating the valve including a flexible member adapted to fold against the valve; and a seal for normally covering said flexible member.

2. A can provided with a delivery opening, a valve having a compartment therein, means for shifting the valve relatively to the can comprising a flexible member foldable against the valve so as to be retained and concealed in the can, and means for sealing the valve, the shifting means and the delivery opening.

3. In combination with a can of single thickness having a delivery opening in its side, a diaphragm within the can forming a sealed chamber save for having an opening to receive measured quantities of material, a valve within the chamber cooperating with and controlling both said openings, and flexible means foldable within the can and connected to the valve for reciprocating the latter, whereby to deliver from the can a predetermined quantity of material.

4. A can provided with a delivery opening in its side, a diaphragm fixed within said can and provided with a delivery opening therein, and a valve having a compartment open on opposite sides and cooperating with the other two openings, and foldable means connected to said valve for sliding the latter relatively to the diaphragm and said valve having a resilient portion which holds the valve snugly against the outer wall of the can and the diaphragm.

5. A can having a diaphragm fixed therein, a delivery opening in the diaphragm and in the can, a valve having a compartment open on opposite sides and cooperative with said other two openings, a resilient member carried by the valve at one end, a non-flexible member also carried by the valve at the other end the two said members cooperating with the can and diaphragm respectively so as to keep the valve in position between the diaphragm and the can, and means for manipulating the valve.

HARRY GOLDSTEIN.